(12) United States Patent
Dorner et al.

(10) Patent No.: US 9,190,888 B2
(45) Date of Patent: Nov. 17, 2015

(54) METHOD OF POSITIONING A SENSOR WITHIN A MOTOR ASSEMBLY

(75) Inventors: Stephen T. Dorner, Springboro, OH (US); Robert J. Marks, Huber Heights, OH (US)

(73) Assignee: Globe Motors, Inc., Dayton, OH (US)

( * ) Notice: Subject to any disclaimer, the term of this patent is extended or adjusted under 35 U.S.C. 154(b) by 302 days.

(21) Appl. No.: 13/446,099

(22) Filed: Apr. 13, 2012

(65) Prior Publication Data

US 2013/0270971 A1 Oct. 17, 2013

(51) Int. Cl.
*H02K 11/00* (2006.01)
*H02K 15/00* (2006.01)
*H02K 3/50* (2006.01)
*H02K 3/52* (2006.01)

(52) U.S. Cl.
CPC .............. *H02K 11/0047* (2013.01); *H02K 3/50* (2013.01); *H02K 3/521* (2013.01); *H02K 2203/09* (2013.01); *Y10T 29/49009* (2015.01)

(58) Field of Classification Search
CPC .............. H02K 11/0021; H02K 29/08; H02K 11/0047; H02K 2203/09; H02K 3/50; H02K 3/521; Y10T 29/49009
USPC ................................ 310/68 B, 68 R; 29/596
See application file for complete search history.

(56) References Cited

U.S. PATENT DOCUMENTS

| | | | |
|---|---|---|---|
| 3,384,801 A | 5/1968 | Rodgers | |
| 4,600,864 A * | 7/1986 | Sato | 318/400.29 |
| 5,525,881 A | 6/1996 | Desrus | |
| 5,763,970 A * | 6/1998 | Dunning et al. | 310/68 B |
| 5,770,902 A | 6/1998 | Batten et al. | |
| 6,078,121 A | 6/2000 | Poag et al. | |
| 6,087,800 A | 7/2000 | Becker et al. | |
| 6,215,213 B1 * | 4/2001 | Forster et al. | 310/78 |
| 6,268,669 B1 | 7/2001 | Wakao et al. | |
| 7,518,273 B2 * | 4/2009 | Kataoka et al. | 310/68 B |
| 7,663,274 B2 * | 2/2010 | Kataoka et al. | 310/68 R |
| 7,679,915 B2 | 3/2010 | Isomoto et al. | |
| 7,705,498 B2 * | 4/2010 | Ortoman et al. | 310/68 B |

(Continued)

FOREIGN PATENT DOCUMENTS

| | | |
|---|---|---|
| DE | 3817080 A1 | 12/1988 |
| EP | 0993095 A1 | 4/2000 |

(Continued)

OTHER PUBLICATIONS

Translation of foreign document WO 2008/141911 A1 (Year: 2008).*

(Continued)

*Primary Examiner* — Alex W Mok
(74) *Attorney, Agent, or Firm* — Stevens & Showalter LLP

(57) ABSTRACT

A method for positioning a temperature sensor in association with a heat conductive surface in a lead frame located at an end of a dynamoelectric machine. The sensor is supported to the lead frame by lead wires to position the sensor at a first position spaced from an outwardly facing surface defined on the outer side of the lead frame. A cover member is moved to an attachment location in engagement with an outer side of the lead frame, wherein at least a final portion of the movement of the cover member includes positioning an engagement surface of the cover member into engagement with the sensor and causing the sensor to move closer to the outwardly facing surface to a location defining a second position for the sensor.

19 Claims, 9 Drawing Sheets

(56) References Cited

U.S. PATENT DOCUMENTS

| | | |
|---|---|---|
| 2003/0127921 A1* | 7/2003 | Akutsu et al. ............... 310/68 R |
| 2003/0169031 A1 | 9/2003 | Viola |
| 2005/0029975 A1 | 2/2005 | Carson et al. |
| 2005/0207473 A1 | 9/2005 | Philip et al. |
| 2006/0063403 A1* | 3/2006 | Kataoka et al. ............. 439/76.2 |
| 2006/0166519 A1* | 7/2006 | Telep et al. .................... 439/34 |
| 2007/0145838 A1* | 6/2007 | Uchitani et al. ............ 310/68 B |
| 2007/0241097 A1* | 10/2007 | Shibata et al. ................ 219/492 |
| 2008/0084139 A1* | 4/2008 | Schroer et al. ............. 310/67 R |
| 2008/0211356 A1* | 9/2008 | Kataoka et al. ............ 310/68 B |
| 2009/0085418 A1* | 4/2009 | Kobayashi et al. ............. 310/66 |
| 2012/0086292 A1 | 4/2012 | Ishida et al. |

FOREIGN PATENT DOCUMENTS

| | | |
|---|---|---|
| EP | 1727261 A1 | 11/2006 |
| EP | 2306622 A1 | 4/2011 |
| WO | 2008141911 A1 | 11/2008 |

OTHER PUBLICATIONS

Herve, Le Chenadec; International Search Report and Written Opinion of the International Searching Authority; International Application No. PCT/US2013/035473; Sep. 11, 2014; Patent Cooperation Treaty; Rijswijk, Netherlands.

* cited by examiner

METHOD OF POSITIONING A SENSOR WITHIN A MOTOR ASSEMBLY

FIELD OF THE INVENTION

The present invention relates to dynamoelectric machines and, more particularly, to a construction for positioning a sensor within a dynamoelectric machine such as a motor.

BACKGROUND OF THE INVENTION

In many conventional dynamoelectric machines, for example interior rotor brushless DC motors, the stator assembly is provided surrounding a rotor that is driven in rotation by a moving magnetic field of the stator assembly. The stator assembly may comprise a magnetic stator core wound with wire coils forming phase windings for producing the magnetic field wherein a current to the different phases of the wire coils is typically controlled by a motor controller, and may be carried by a motor termination board or lead frame containing fretwork. An example of a known brushless DC motor, including a termination board, is described in U.S. Pat. No. 5,770,902, which patent is incorporated herein in its entirety.

Such motors often include sensors to enable the motor controller to compensate for varying conditions that could result in variations in operation of the motor such as variations in an intended motor speed. Sensors that may be included comprise current sensors, temperature sensors or other sensors. Control of the current within the motor with reference to one or more selected conditions may be desirable to ensure that a motor speed or torque is controlled to a desired value with the varying conditions or to sense a condition requiring a particular response from the motor controller.

SUMMARY OF THE INVENTION

In accordance with an aspect of the invention, a method is provided for positioning a sensor in association with an end of a dynamoelectric machine. The dynamoelectric machine comprises a stator assembly and a rotor, and the dynamoelectric machine includes a lead frame at the end thereof defining an outer side. The method comprises providing a sensor supported at the end of the dynamoelectric machine by a deformable structure having a first end connected adjacent to the lead frame and a second end connected to the sensor. The sensor is positioned at a first position spaced from an outwardly facing surface defined on the outer side of the lead frame, the first position being spaced from a second, sensing position for the sensor. The cover member is moved to an attachment location in engagement with the outer side of the lead frame, wherein at least a final portion of the movement of the cover member to engage with the outer side includes positioning an engagement surface of the cover member into engagement with the sensor and causing the sensor to move closer to the outwardly facing surface to a location defining the second, sensing position.

In accordance with further aspects of the invention, the outwardly facing surface may be located within a recess formed in the outer side of the lead frame, and may include depositing a gap-filling material in the recess, and the step of moving the cover member may include biasing the sensor into the gap-filling material. The sensor may comprise a temperature sensor and the gap-filling material may comprise a thermally conductive gap filler.

The step of moving the cover member and causing the sensor member to move to the second, sensing position may include engaging the cover member at a fixed position on the outer side of the lead frame with the sensor positioned such that it is within a predetermined distance away from the outwardly facing surface.

In accordance with other aspects, the sensor may comprise a temperature sensor having an outer sensor surface and the outwardly facing surface may be defined on an electrical conductor extending along the lead frame, and engagement between the engagement surface of the cover member and the outer sensor surface positions a portion of the outer sensor surface facing toward the outwardly facing surface at a location within a range defined between a location at a predetermined distance from the outwardly facing surface to a location at the outwardly facing surface.

The lead frame may include an outer periphery and circumferentially spaced electrical connection points extending from the outer periphery. The method may further include a step of positioning the lead frame on the stator assembly comprising moving the lead frame onto an end of the stator assembly resulting in positioning of the electrical connection points on the lead frame in association with stator leads extending from the stator assembly. The stator leads may be soldered to the electrical connection points prior to moving the sensor to the second, sensing position.

The deformable structure may comprise a pair of sensor leads defined by wires extending from and flexibly supporting the sensor to a location on the lead frame, and the sensor leads may extend from an inner side of the lead frame, opposite the outer side of the lead frame.

The lead frame may include a first guide structure and the cover member may include a second guide structure configured to engage the first guide structure, and the step of moving the cover member includes the second guide structure moving along a predetermined path defined by engagement of the first and second guide structures. The first guide structure may be formed by posts extending from the outer side of the lead frame, and including a step of expanding an end of each of the posts in a forming operation to retain the cover member in position over the sensor.

According to a further aspect of the invention, a method is provided for positioning a temperature sensor in association with a heat conductive surface in a lead frame for a dynamoelectric machine comprising a stator assembly and a rotor. The method comprises providing a lead frame having a temperature sensor supported thereto by a pair of wire leads extending from the temperature sensor to a connection on a portion of the lead frame; positioning the lead frame on the stator assembly, the lead frame including an outer side, opposite from the stator assembly, and the outer side defining a portion comprising an outwardly facing surface; positioning the sensor at a first position spaced from the outwardly facing surface of the lead frame, the first position being spaced from a second, sensing position for the sensor; and moving a cover member to an attachment location in engagement with the outer side of the lead frame, wherein at least a final portion of the movement of the cover member to engagement with the outer side includes positioning an engagement surface of the cover member into engagement with the sensor and causing the sensor to move closer to the outwardly facing surface to a location defining the second, sensing position.

The lead frame may have a radially outer periphery and a radially inner portion, and prior to the moving of the cover member to the attachment location, the sensor may be moved in a first direction from a position supported by the lead wires adjacent to the outer periphery to a position supported by the lead wires between the outer periphery and the inner portion where the sensor is positioned in the first position over the outwardly facing surface. The step of causing the sensor to move closer to the outwardly facing surface may include moving the sensor in a second direction that is generally perpendicular to the first direction.

The sensor includes an outer sensor surface, and a portion of the outer sensor surface facing toward the outwardly facing surface may be located within a range defined between a location at a predetermined distance from the outwardly facing surface to a location at the outwardly facing surface, as measured along the second direction, when the sensor is in the second, sensing position.

In accordance with an additional aspect of the invention, a lead frame assembly is provided for a dynamoelectric machine having a stator assembly and a rotor. The lead frame assembly comprises a lead frame positioned on the end of the stator assembly, the lead frame including an outer side, opposite the stator assembly, defining a recess. A sensor is supported by a pair of wire leads extending across a portion of the outer side of the lead frame, and the sensor is located within the recess. A cover member is located in engagement with the outer side of the lead frame and extends across the recess, and an engagement surface of the cover member is located for engagement with the sensor to position the sensor at a sensing position adjacent to an outwardly facing surface defined within the recess.

Further aspects of the invention may include the sensor comprising a temperature sensor, and including a thermally conductive gap filler located within the recess between the sensor and the outwardly facing surface. The outwardly facing surface may be defined by an electrical conductor extending along the lead frame. The sensor includes an outer sensor surface and the outwardly facing surface may be defined on an electrical conductor extending along the lead frame, and a portion of the outer sensor surface facing toward the outwardly facing surface may be located within a range defined between a location at a predetermined distance from the outwardly facing surface to a location at the outwardly facing surface.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
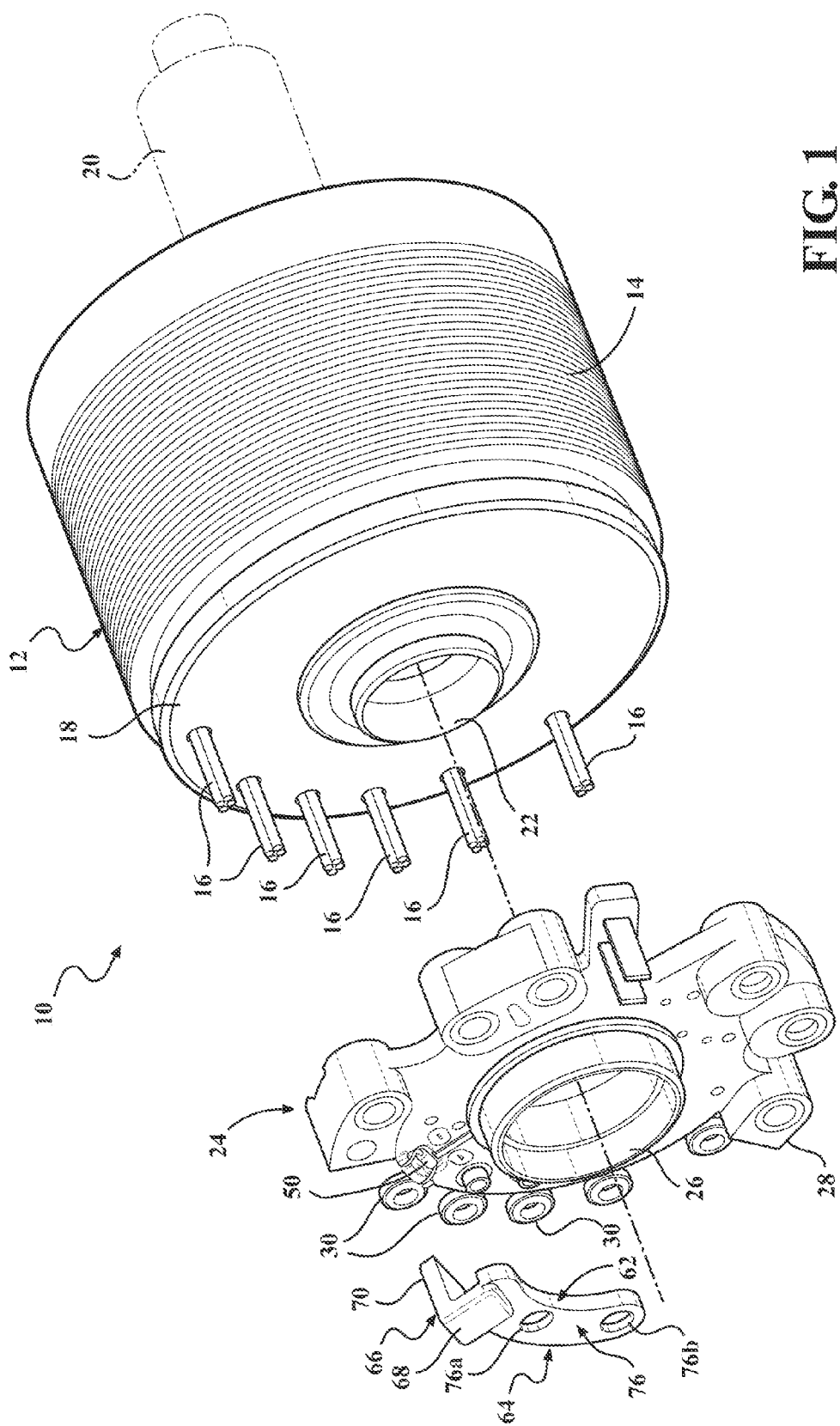
FIG. 1 is an exploded perspective view of a motor assembly illustrating aspects of the present invention.

Referring to FIG. 1, in accordance with an aspect of the invention, a dynamoelectric machine is illustrated embodied as a brushless DC motor 10. Although the present invention is described with reference to the motor 10, it should be understood that, within the spirit and scope of the invention, the aspects of the present invention may generally be implemented in other machines.

The motor 10 includes a stator assembly 12 including a stator core 14 supporting a plurality of wire coils or phase windings (not shown), and the windings having termination ends 16 extending axially from a termination side 18 of the stator assembly 12. For example, six termination ends 16 are illustrated for providing electrical connections for three phase windings of the motor 10. A rotor assembly 20 is illustrated diagrammatically and extends through a central passage 22 formed in the stator core 14.

Figure 2:
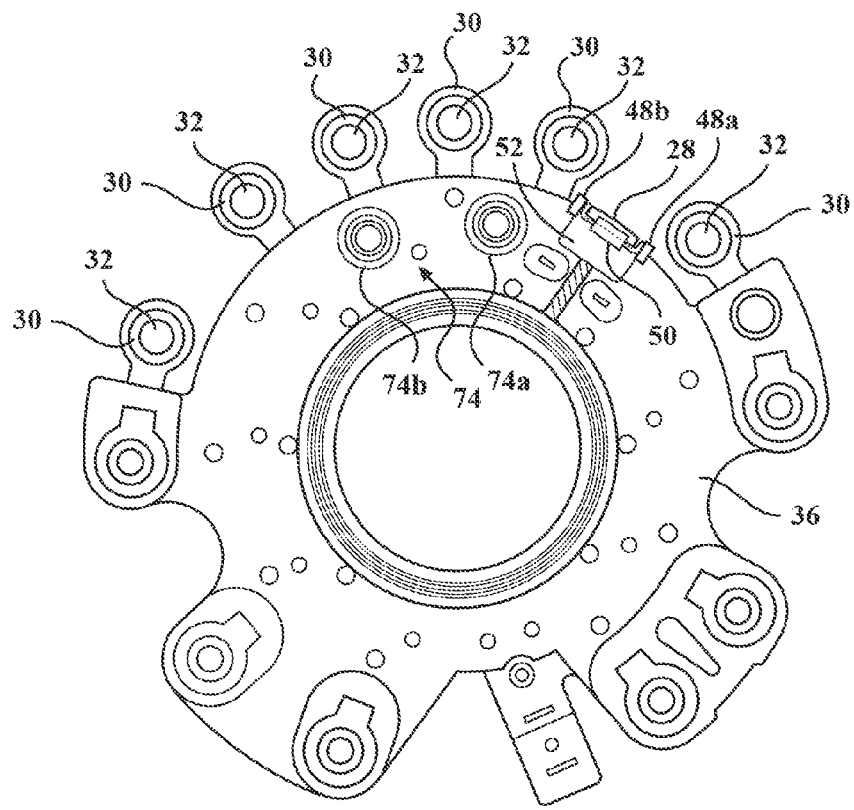
FIG. 2 is a plan view of an outer side of a lead frame illustrating aspects of the present invention.
Figure 3:
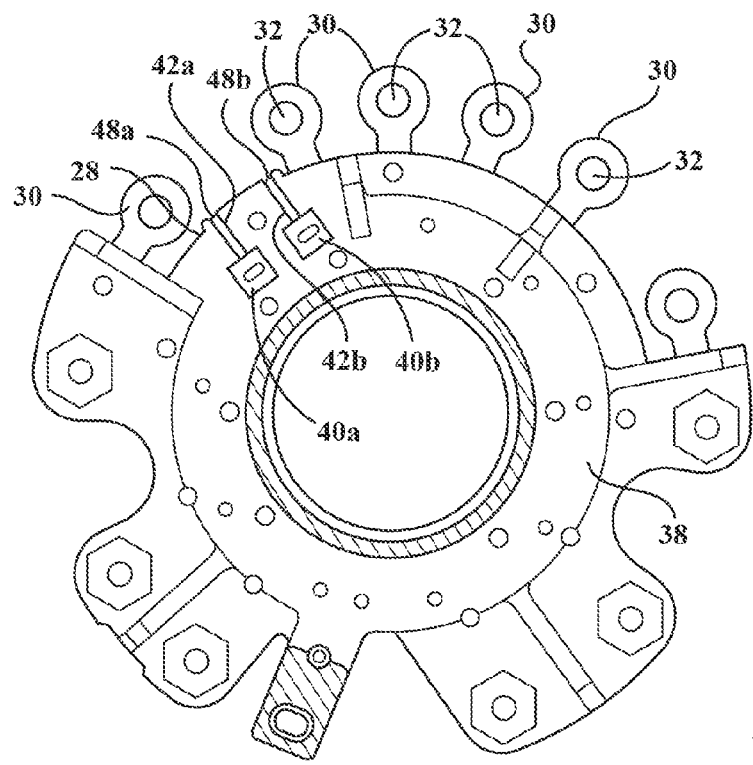
FIG. 3 is a plan view of an inner side of the lead frame illustrating aspects of the present invention prior to attachment of the sensor.

A lead frame 24 is located at the termination side 18 of the stator assembly 12 and comprises a generally annular structure including an inner portion 26 generally concentric with the central passage 22 of the stator core 14, and an outer periphery 28 spaced radially outwardly from the inner portion 26. Referring further to FIGS. 2 and 3, a plurality of electrical connection points are located around the outer periphery 28 and comprise a plurality of circumferentially spaced eyelets 30 including wire receiving passages 32 located for positioning over and being conductively connected to respective ones of the termination ends 16.

Figure 6:
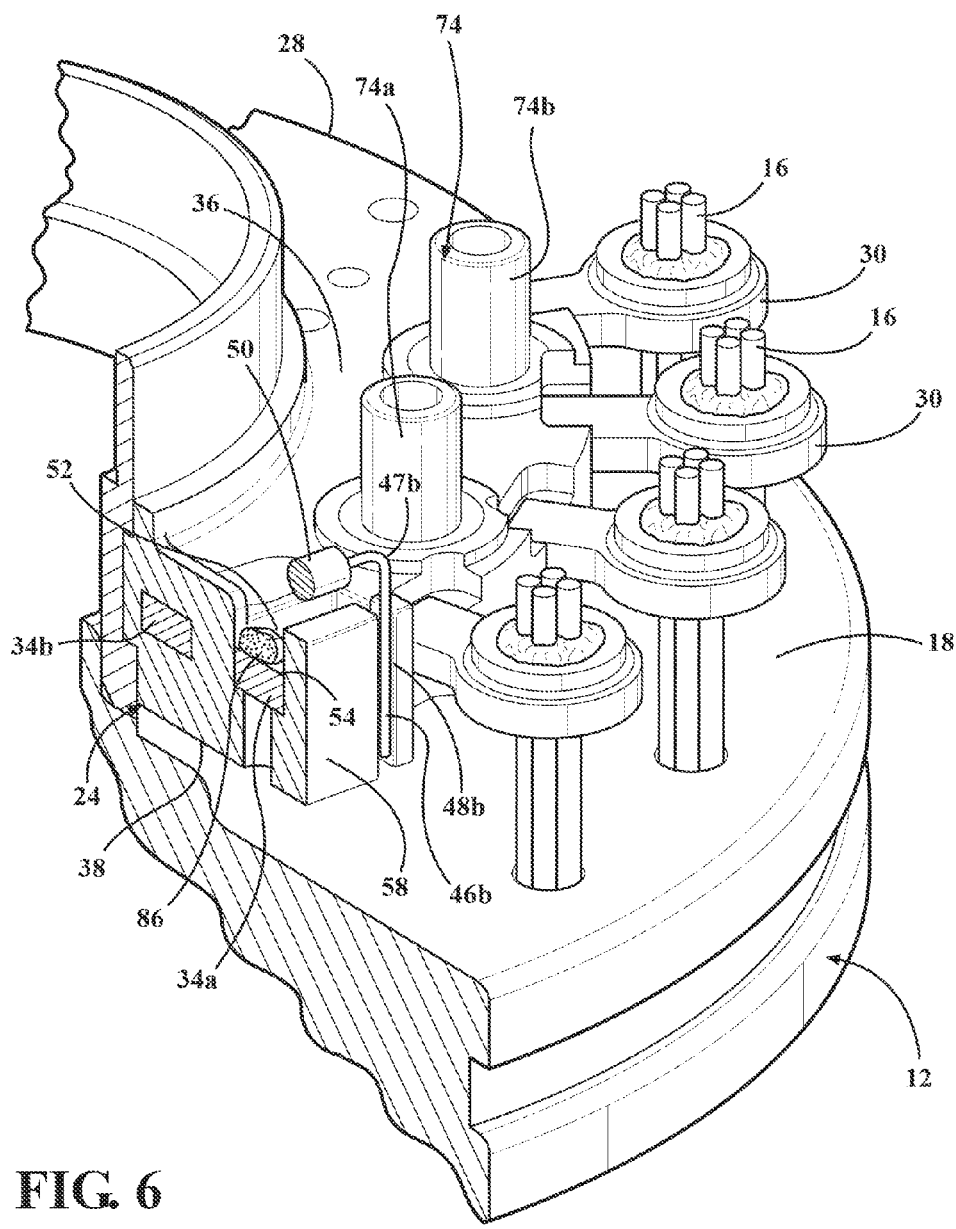
FIG. 6 is a cut-away perspective view illustrating the lead assembly soldered in position, and the sensor in its first position.

The lead frame 24 additionally includes electrically conductive fretwork, as is generally represented by the electrical conductors 34a, 34b illustrated, for example, in FIG. 6. The eyelets 30 provide electrical connections from the winding termination ends 16 to the fretwork, e.g., 34a, 34b, and the fretwork provides an interface between the phase windings and a controller (not shown), and optionally other components such as sensors, for controlling the motor 10 through energizing of the phase windings. The lead frame 24 may be formed of a resin material generally defining the structural configuration of the lead frame 24, and including metal conductors extending radially and/or circumferentially along the structure thereof to form electrical paths through and between desired locations of the lead frame 24.

Figure 5:
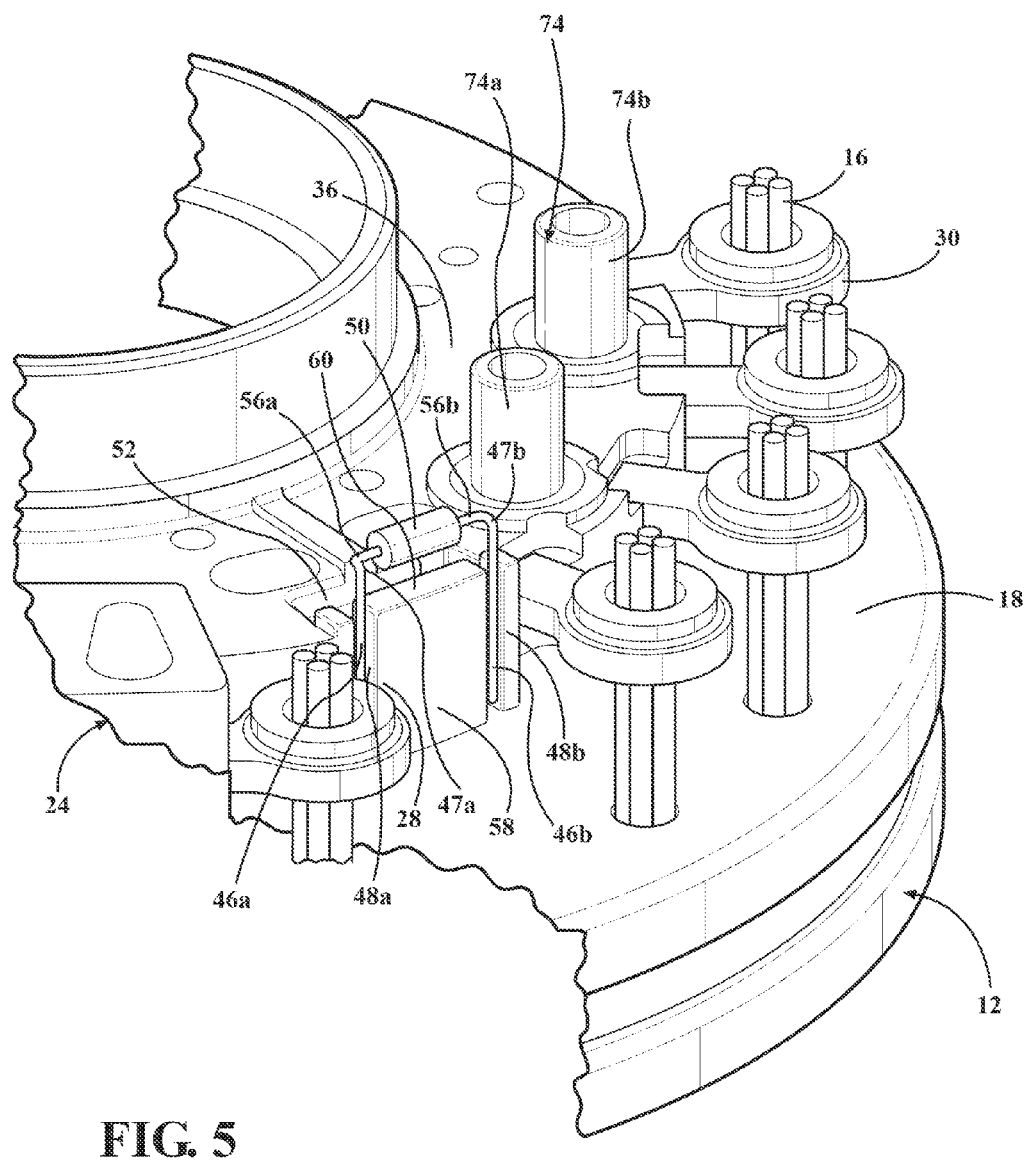
FIG. 5 is a perspective view illustrating the lead frame on a stator assembly, and with the sensor in a first position.

The lead frame 24 has an outer side 36 (FIG. 2) facing outwardly away from the stator assembly 12, and an inner side 38 (FIG. 3) facing inwardly toward the stator assembly 12. As seen in FIG. 3, the inner side 38 includes a pair of contact pads 40a, 40b and respective slots 42a, 42b extending from the locations of the contact pads 40a, 40b to the outer periphery 28 of the lead frame 24. The pads 40a, 40b are provided for connection to first ends of respective wire leads 46a, 46b extending from a sensor 50 (FIG. 5). In the illustrated embodiment, the sensor 50 is illustrated as having cylindrical body with the wire leads 46a, 46b extending from opposing ends of the cylinder at second ends of the leads 46a, 46b. However, it should be understood that in accordance with aspects of the invention, other configurations for the sensor and leads may be implemented including any geometric configuration and lead interface location that may operate in accordance with the motor structure and assembly process described herein.

In a pre-assembly configuration of the lead frame 24, the sensor leads 46a, 46b may be fused/welded to the pads 40a, 40b. Other techniques may be used to attach the leads 46a, 46b to the pads 40a, 40b such as, for example, soldering. The leads 46a, 46b function as a deformable support structure for the sensor 50, and are positioned extending along the inner side 38 radially outwardly, positioned at least partially within the slots 42a, 42b. While it is contemplated that the leads 46a, 46b have a certain degree of resilience or elasticity, they generally comprise an inelastically deformable structure for supporting the sensor 50 at a predetermined location on the pre-assembly configuration of the lead frame 24. Further, axially extending slots 48a, 48b may be provided in the outer periphery 28 of the lead frame 24 for receiving the leads 46a, 46b. Hence, as described herein, the pre-assembly configuration of the lead frame 24 includes the leads 46a, 46b extending from the inner side 38, wrapping around the outer periphery 28 through the axially extending slots 48a, 48b, and extending to a location axially outwardly from the outer side 36. That is, the sensor 50 is positioned with a portion of the leads 46a, 46b extending beyond the outer side 36. In addition, the pre-assembly configuration of the lead frame 24 may include the outer ends of the leads 46a, 46b bent to position the sensor 50 radially inwardly over at least a portion of the outer side 36 adjacent to the outer periphery 28.

Figure 2A:
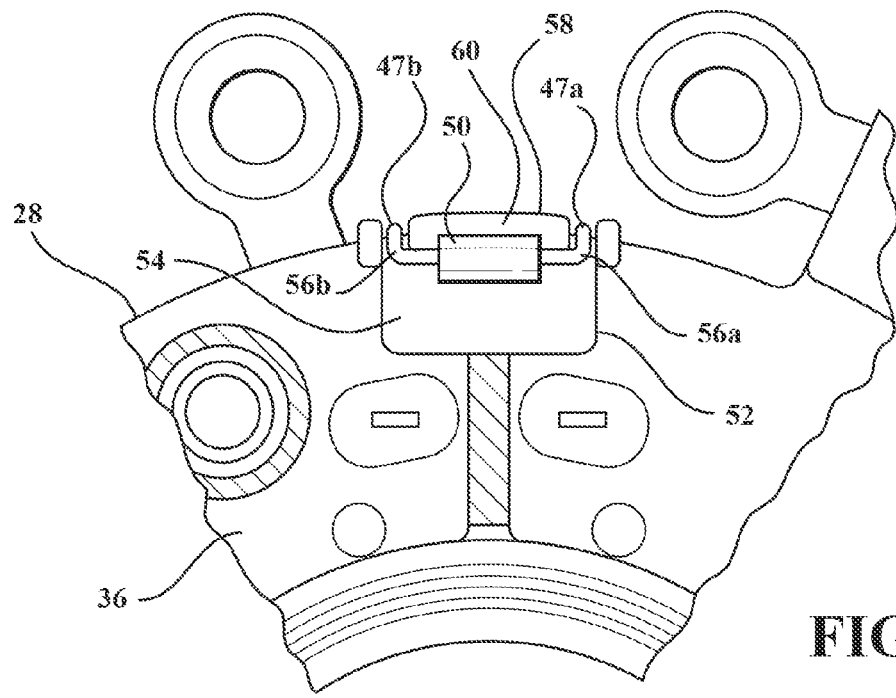
FIG. 2A is a plan view of a portion of the outer side of the lead frame illustrating a sensor at an initial position corresponding to a pre-assembly configuration for the lead frame.
Figure 4:
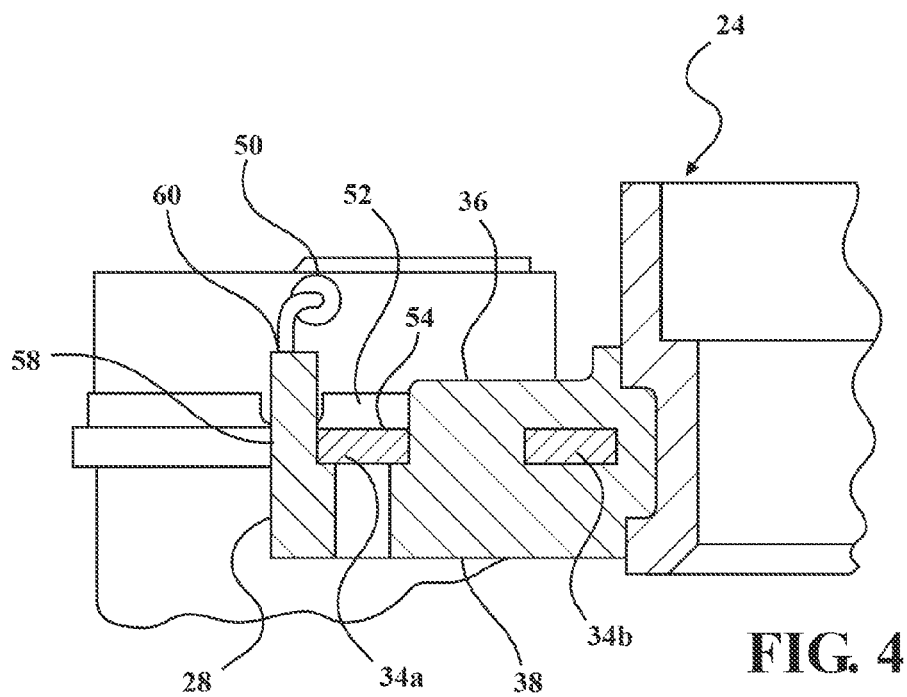
FIG. 4 is a cross-sectional view through the lead frame at the location of a sensor pocket and illustrating the sensor at the initial position corresponding to the pre-assembly configuration for the lead frame.

The outer side of the lead frame 24 includes a recess or sensor pocket 52 formed therein, as may be seen in FIGS. 2, 4 and 6. An inner portion of the recess or sensor pocket 52 defines an outwardly facing surface 54 at the outer side 36 of the lead frame 24. In accordance with an aspect of the invention, the outwardly facing surface 54 is defined by a surface of the electrical conductor 34a of the fretwork, and the sensor 50 may comprise a temperature sensor such as, for example, a thermistor for sensing a temperature of the electrical conductor 34a. A circumferential extent or length of the sensor pocket 52 is preferably at least as long as the sensor 50 and associated leads 46a, 46b at the first ends thereof. For example, in the illustrated embodiment the leads 46a, 46b extend from the ends of the sensor 50 before turning generally 90 degrees at respective junctions 56a, 56b, and extending parallel to each other to the location where they extend through the slots 48a, 48b along the outer periphery 28. Additionally, a radially inwardly angled bend 47a, 47b (FIGS. 2A and 5) may be provided adjacent axially outer ends of the leads 46a, 46b to define the pre-assembly position of the sensor 50 at a location that is adjacent to and radially inward from the outer periphery 28. It may be noted with regard to FIG. 1 that the sensor 50 is shown for illustrative purposes displaced from its pre-assembly position to a second position, described further below.

A wall portion 58 of the outer periphery 28 generally located adjacent to the slots 48a, 48b extends axially beyond the outer side 36 of the lead frame 24 in an area directly adjacent to the sensor pocket 52. The axially extending slots 48a, 48b are defined in a radially facing surface of the wall portion 58, and an outer wall surface 60 is defined at an axially outer end of the wall portion 58 defining a portion of the outer side 36.

Figure 10:
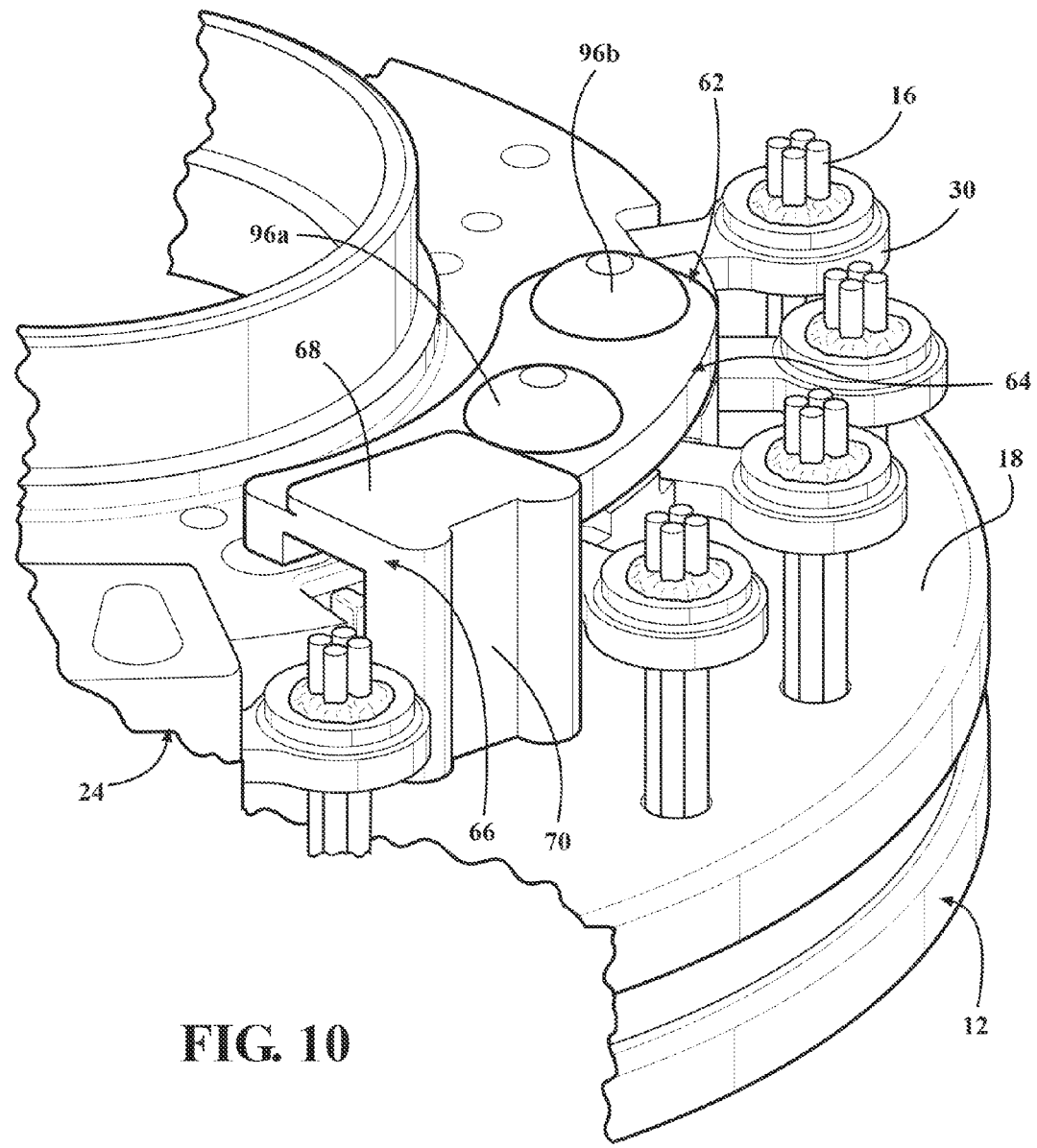
FIG. 10 is a perspective view illustrating the cover member positioned on the lead frame in an attached configuration.

Referring to FIG. 1, a cover member 62 is formed separately from the lead frame 24 for attachment to the lead frame 24 in the area of the sensor pocket 52 and the wall portion 58. Referring additionally to FIG. 10, the cover member 62 comprises a mounting body portion 64 and a pocket closure portion 66. The mounting body portion 64 and pocket closure portion 66 are preferably formed integrally, such as in the form of an integrally molded resin component. The mounting body portion 64 in the illustrated embodiment comprises a circumferentially elongated section configured to extend around a portion of the outer side 36 of the lead frame 24 adjacent to the outer periphery 28. The pocket closure portion 66 may be located at one end of the mounting body portion 64, and the pocket closure portion 66 includes a radial cover portion 68 and an axial leg portion 70 extending perpendicular to each other. It may be understood that other configurations for the cover member 62 may be provided including locating the pocket closure portion 66 at any location relative to the mounting body portion 64, including at locations between opposing ends of the mounting body portion 64.

In accordance with an aspect of the invention, the lead frame 24 includes a first guide structure 74, illustrated as a pair of axially extending guide posts 74a, 74b extending axially from the outer side 36, as may be seen in FIGS. 2 and 5. Referring further to FIG. 1, the mounting body portion 64 of the cover member 62 includes a second guide structure 76 for cooperating with the first guide structure 74 for guiding and/or attaching the cover member 62 to the lead frame 24. The second guide structure 76 includes a pair of through holes 76a, 76b formed in the mounting body portion 64 for receiving the guide posts 74a, 74b in sliding engagement. It may be understood that, although posts 74a, 74b and holes 76a, 76b having a round cross-sectional configuration are illustrated, other shapes and/or configurations may be provided for the first and second guide structures 74, 76.

Figure 9:
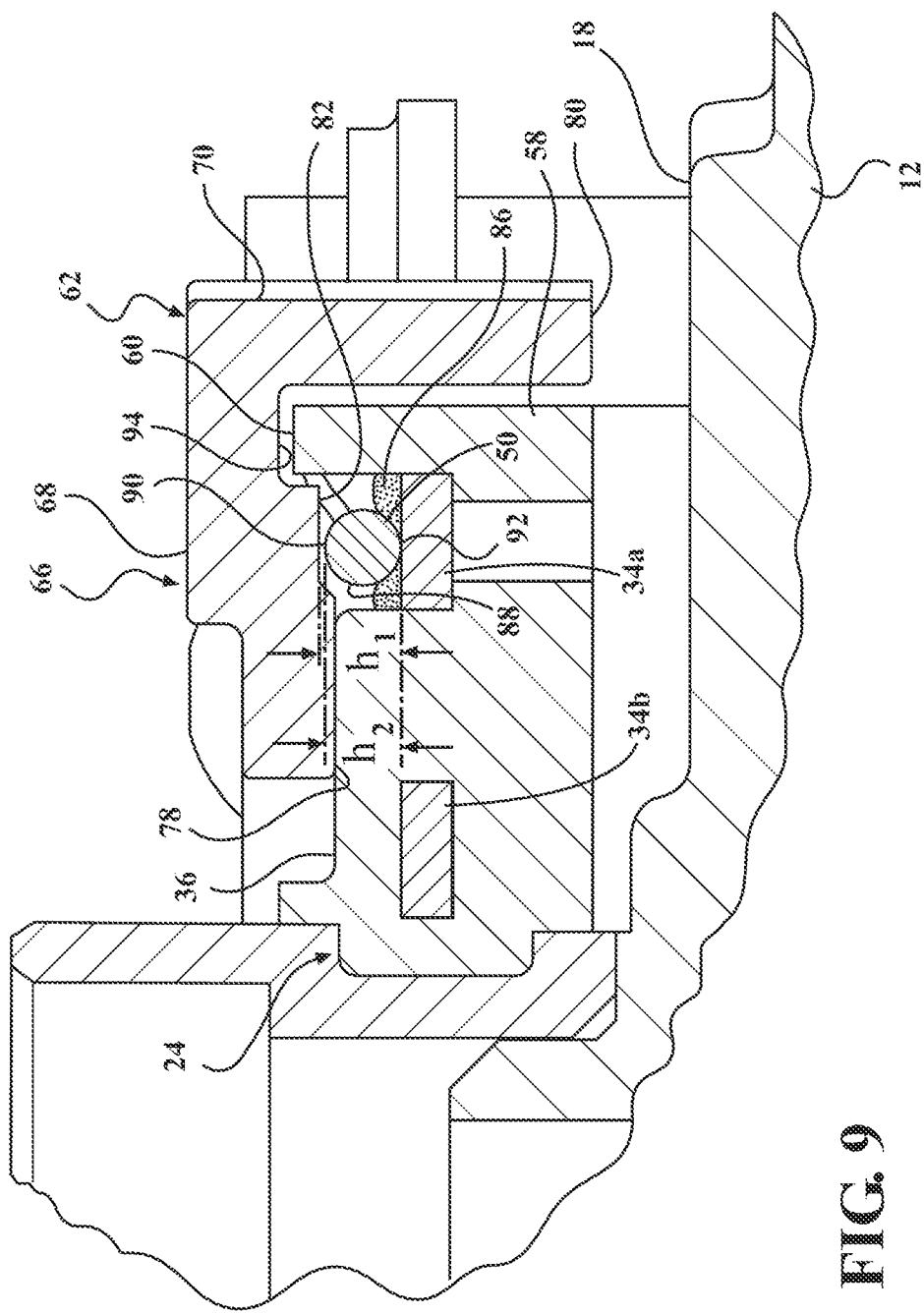
FIG. 9 is an elevation cross-sectional view of the cover member positioned on the lead frame.

As may be seen in FIG. 9, the pocket closure portion 66 of the cover member 62 includes a first inner surface 78, a second inner surface 80 and a sensor engagement surface 82. The first inner surface 78 is located radially inwardly from the second inner surface 80 and is configured to engage against the outer side 36 of the lead frame 24. The second inner surface 80 is configured to be positioned adjacent to and spaced from the termination side 18 of the stator assembly 12. The first inner surface 78 defines an axial location for the sensor engagement surface 82 relative to the outwardly facing surface 54 in the sensor pocket 52.

A process for positioning the sensor 50 in association with the outwardly facing surface 54 of the lead frame 24 will be described with initial reference to FIG. 1, and subsequent reference to FIGS. 5-10. The lead frame 24, as described above in its pre-assembly configuration, is initially moved into association with the termination side 18 of the stator assembly 12. As the lead frame 24 and the stator assembly 12 are positioned together, the termination ends 16 are positioned through the passages 32 in the eyelets 30 and the inner side 38 of the lead frame 24 is engaged on the termination side 18 of the stator assembly 12, as is depicted in FIG. 5. The termination ends 16 are then soldered or otherwise electrically connected to the eyelets 30, as depicted in FIG. 6.

As may be seen in FIG. 6, a gap-filling material 86 is deposited on the outwardly facing surface 54 of the electrical conductor 34a. The gap filling material 86 is preferably a thermally conductive gap-filling material, such as a gap filling material having a thermal conductivity of about 1.8 W/m·K. For example, the gap-filling material may comprise a ceramic filled dispensible silicone gel. In accordance with aspects of the invention, the thermally conductive gap-filling material 86 facilitates transfer of heat to the sensor 50 for accurate sensing of the temperature of the electrical conductor 34a.

Figure 7:
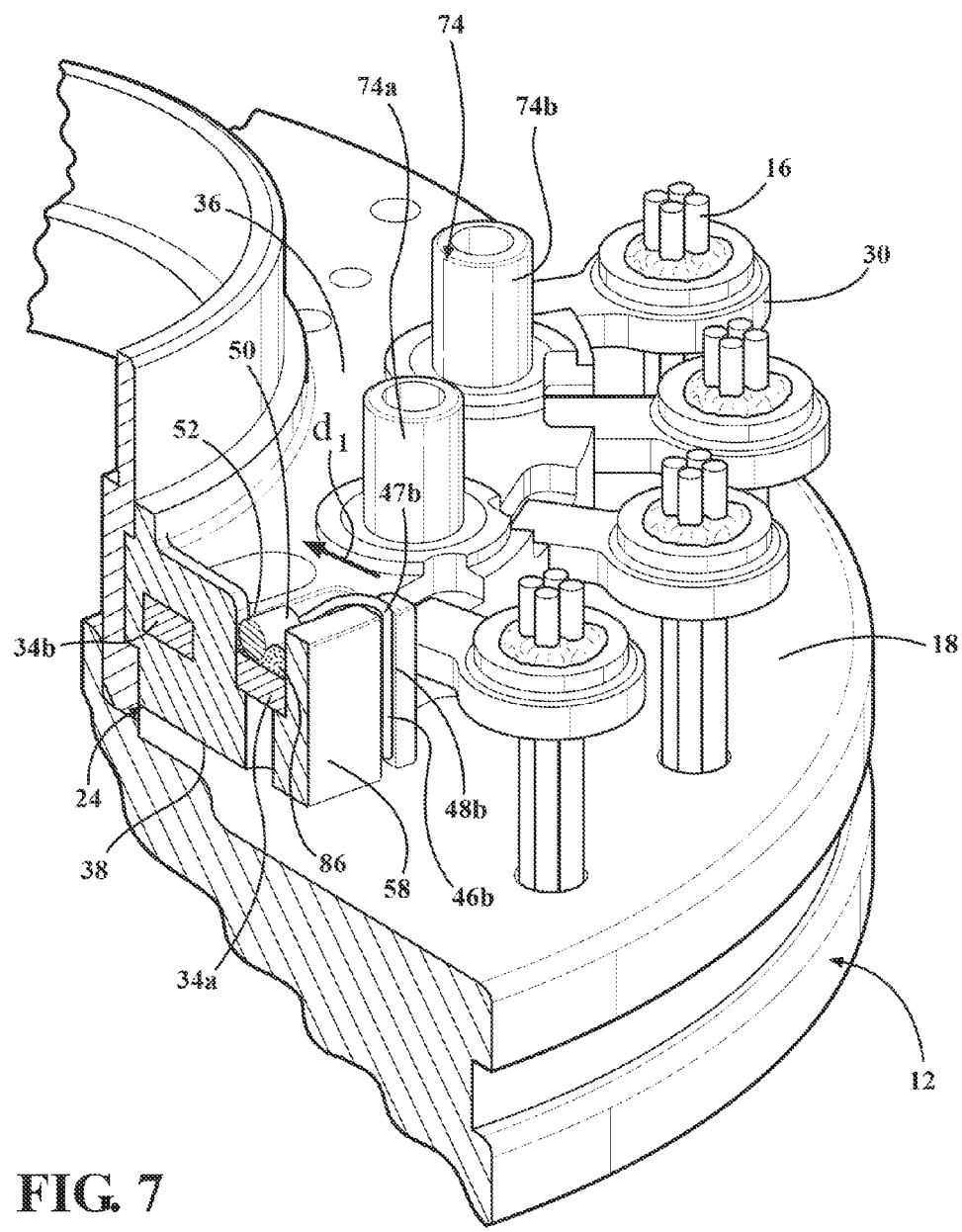
FIG. 7 is cut-way perspective view illustrating the sensor in a second position.

Referring to FIG. 7, the sensor 50 is then moved in at least a first direction $d_1$ to position the sensor 50 at a predetermined first position between the outer periphery 28 and the inner portion 26, and spaced from the outwardly facing surface 54 defined by the electrical conductor 34a. The movement in the first direction $d_1$ for positioning the sensor 50 radially inwardly may be accomplished by bending the leads 46a, 46b radially inwardly at the outer wall surface 60, where the leads 46a, 46b extend radially inwardly of the outer side 36 within extensions of the slots 48a, 48b. The initial movement of the sensor 50 may additionally position the sensor 50 at least partially within the sensor pocket 52.

Figure 8:
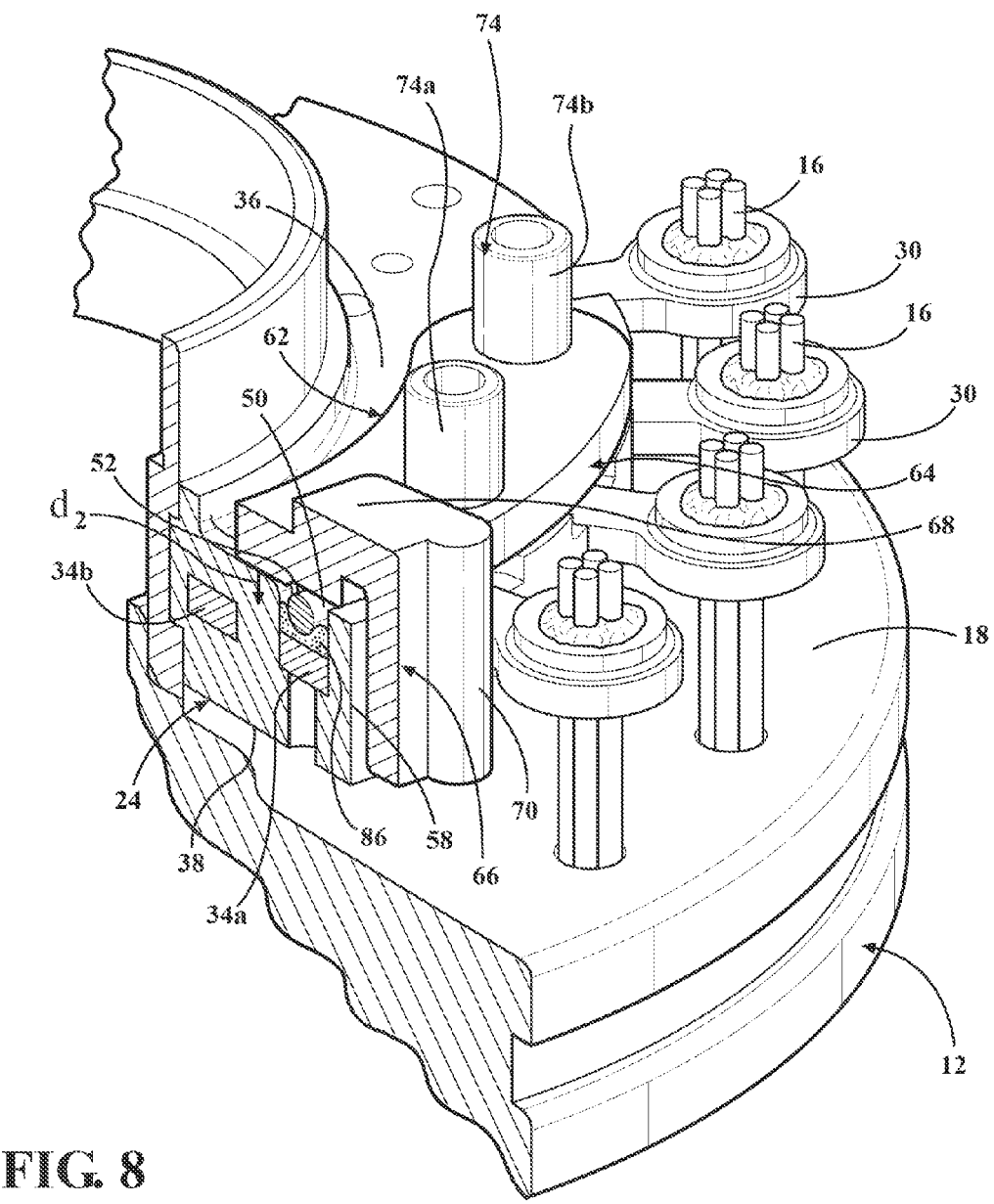
FIG. 8 is cut-way perspective view illustrating a cover member positioned on the lead frame.

The cover member 62 is then positioned on the lead frame 24 with the posts 74a, 74b engaged through the holes 76a, 76b in the cover member 62. Sliding movement of the cover member 62 along the posts 74a, 74b causes the sensor engagement surface 82 to engage and move the sensor 50 in a second direction $d_2$ generally perpendicular to the first direction $d_1$, biasing the sensor 50 into the gap-filling material 86 and locating the sensor 50 in a second, sensing position, as is depicted in FIG. 8. In particular, it may be understood that the sensor 50 includes an outer sensor surface 88 (FIG. 9) having an outwardly facing portion 90 that may be engaged by the sensor engagement surface 82 during at least a final portion of the movement of the cover member 62 along the posts 76a, 76b to its final position in engagement with the outer side 36 of the lead frame 24.

The sequence of initially providing the sensor 50 on the lead frame 24 at a position displaced from the sensor pocket 52 in the pre-assembly configuration, prior to movement of the sensor into association with the outwardly facing surface 54, is provided to protect the sensor 50 from excessive heat during attachment of the lead frame 24 to the stator assembly 12. That is, the soldering operation performed for attachment of the eyelets 30 to the termination ends 16 causes heat to be propagated along the fretwork such that the electrical conductors 34a, 34b are at an elevated temperature that may damage the sensor 50 if it were in thermal contact with the electrical conductor 34a. The present process is designed to locate the sensor 50 in a protected or displaced position until the lead frame attachment step is performed.

Referring to FIG. 9, it should be noted that the distance $h_1$ between the sensor engagement surface 82 and the outwardly facing surface 54 of the electrical conductor 34a is greater than the distance $h_2$ between the outwardly facing portion 90 and an inwardly facing portion 92 of the sensor 50. The difference between $h_1$ and $h_2$ is preferably about 0.5 mm to define a small gap between the sensor and one or both of the outwardly facing surface 54 and the sensor engagement surface 82. The second position of the sensor 50 is defined as any position within the span of $h_1$, wherein the inwardly facing portion may be located between a location at a predetermined distance spaced from the outwardly facing surface 54 and a location in contact with the outwardly facing surface 54. The gap formed by the difference between $h_1$ and $h_2$ provides a space to compensate for any variations in the depth of the sensor pocket 52 resulting from manufacturing tolerances.

In FIG. 9, the small gap is illustrated as being above the sensor 50. However, the second position of the sensor 50 may be in engagement with the sensor engagement surface 82, such that the small gap may be defined by a maximum predetermined distance, e.g., 0.5 mm, between the sensor 50 and the outwardly facing surface 54. A sufficient amount of the thermally conductive gap-filling material 86 is located on the outwardly facing surface 54 to ensure that the sensor 50 is in thermal contact with the outwardly facing surface 54 when the maximum gap is located adjacent to the outwardly facing surface 54. Further, the gap-filling material 86 may facilitate stationary positioning of the sensor 50 within the sensor pocket 52 and/or dampen any movement of the sensor 50. The particular physical characteristics of the gap-filling material 86 may vary and may comprise a material that can be dispensed as a flowable material and subsequently cured to a harder consistency.

By maintaining the position of the sensor 50 within a predetermined maximum distance of the outwardly facing surface, variations or errors in the output of the sensor, such as may occur if the sensor 50 is inaccurately positioned or is positioned to a location beyond the maximum distance, are avoided. The sensor 50 may typically be used in the motor control circuit, where a thermistor output monitoring a phase fretwork temperature, as may be represented by the sensor 50 adjacent to the electrical conductor 34a, may be used as a critical input variable in the motor control circuit.

In addition to providing and maintaining a predetermined sensor position, the cover member 62 further provides a protective cover for the sensing area defined by the sensor pocket 52 and the sensor 50. The radial cover portion 68 spans the sensor pocket 52, both radially and circumferentially. In addition, the axial leg portion 70 extends circumferentially across the wall portion 58 to cover the slots 48a, 48b and associated leads 46a, 46b, extending to an axial location where the second inner surface 80 is adjacent to the inner side 38 of the lead frame 24. It may be understood that the leg portion 70 may extend any distance toward or beyond the inner side 38 of the lead frame 24, to the extent permitted by the particular design of the lead frame 24 and the end of the stator assembly 12, to protect the leads 46a, 46b. The pocket closure portion 66 protects both the sensor 50 and its associated leads 46a, 46b from being contacted during subsequent assembly operations, or other handling or use of the motor 10. Additionally, the radial cover portion 68 is effective to contain the thermal gap-filling material 86 and to prevent debris from entering the sensor pocket 52, which could contaminate the thermal gap-filling material 86 and adversely affect temperature sensing by the sensor 50.

The inner configuration of the pocket closure portion 66 may be formed to facilitate positioning of the sensor engagement surface 82 to its predetermined position for retaining the sensor 50 while also preventing passage of debris. As illustrated in FIG. 9, the sensor engagement surface 82 is located axially outwardly from the outer side 36 of the lead frame 24, and the wall outer wall surface 60 of the wall portion 58 is located outwardly from the engagement surface 82. The inner surface of the pocket closure portion 66 is contoured around the wall portion 58 and includes an inner surface 94 spaced from the outer wall surface 60 to form a labyrinth path adjacent to the inner surface 94 for preventing passage of debris around the wall portion 58 adjacent to the radially outer side of the sensor pocket 52. The space adjacent to the inner surface 94 ensures that the wall portion 58 does not interfere with the axial positioning of the cover member 62, as defined at the support surface 78.

Referring to FIG. 10, the cover member 62 may be retained in its position on the lead frame 24 by subjecting the outer ends of the guide posts 74a, 74b to a forming operation. For example, the forming operation may be performed to expand the ends of the guide posts 74a, 74b radially outwardly to form retention heads 96a, 96b at the ends of the guide posts 74a, 74b. The forming operation may comprise a staking operation, or other operation for forming a desired configuration at the ends of the guide posts 74a, 74b. It may be understood that, within the spirit and scope of the invention, other retention mechanisms may be used to affix the cover member 62 to the lead frame 24.

It may be understood that the above-described assembly process includes steps that can facilitate automated assembly of the lead frame 24 to the stator assembly 12. Further, as described above, the assembly process facilitates accurate placement of the sensor 50, as well as protection of the sensor 50 and associated leads 46a, 46b following installation.

Further, it may be understood that although a particular arrangement for supporting the sensor leads 46a, 46b is illustrated herein, other support arrangements may be provided. For example, the leads 46a, 46b may be routed through holes or other openings formed through the lead frame 24. Alternatively, the pads 40a, 40b may be located on the outer side 36 of the lead frame 24, or other lead connection structure may be provided at another location on or within the lead frame 24.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for positioning a sensor in association with an end of a dynamoelectric machine comprising a stator assembly and a rotor, the dynamoelectric machine including a lead frame attached at the end of a stator core for the stator assembly and defining an inner side facing toward the stator core and an oppositely facing outer side, the method comprising:
    providing a sensor supported at the end of the dynamoelectric machine by a deformable structure having a first end connected adjacent to the lead frame and a second end connected to the sensor;
    positioning the sensor at a first position with the second end of the deformable structure supporting the sensor spaced from an outwardly facing surface defined on the outer side of the lead frame, the first position being spaced from a second, sensing position for the sensor; and
    moving a cover member to an attachment location in engagement with the outer side of the lead frame, wherein at least a final portion of the movement of the cover member to engage with the outer side includes positioning an engagement surface of the cover member into engagement with the sensor and causing the sensor to move closer to the outwardly facing surface of the lead frame to a location defining the second, sensing position.

2. The method of claim 1, wherein the outwardly facing surface is located within a recess formed in the outer side of the lead frame, and including depositing a gap-filling material in the recess, and the step of moving the cover member including biasing the sensor into the gap-filling material.

3. The method of claim 2, wherein the sensor comprises a temperature sensor and the gap-filling material comprises a thermally conductive gap filler.

4. The method of claim 1, wherein the step of moving the cover member and causing the sensor member to move to the second, sensing position includes engaging the cover member at a fixed position on the outer side of the lead frame with the sensor positioned such that it is within a predetermined distance away from the outwardly facing surface.

5. The method of claim 4, wherein the sensor comprises a temperature sensor having an outer sensor surface and the outwardly facing surface is defined on an electrical conductor extending along the lead frame, and engagement between the engagement surface of the cover member and the outer sensor surface positions a portion of the outer sensor surface facing toward the outwardly facing surface at a location within a range defined between a location at a predetermined distance from the outwardly facing surface to a location at the outwardly facing surface.

6. The method of claim 1, wherein the lead frame includes an outer periphery and circumferentially spaced electrical connection points extending from the outer periphery, and including a step of positioning the lead frame on the stator assembly comprising moving the lead frame onto an end of the stator assembly resulting in positioning of the electrical connection points on the lead frame in association with stator leads extending from the stator assembly.

7. The method of claim 6, including soldering the stator leads to the electrical connection points prior to moving the sensor to the second, sensing position.

8. The method of claim 1, wherein the deformable structure comprises a pair of sensor leads defined by wires extending from and flexibly supporting the sensor to a location on the lead frame.

9. The method of claim 8, wherein the sensor leads extend from an inner side of the lead frame, opposite the outer side of the lead frame.

10. The method of claim 1, wherein the lead frame includes a first guide structure and the cover member includes a second guide structure configured to engage the first guide structure, and the step of moving the cover member includes the second guide structure moving along a predetermined path defined by engagement of the first and second guide structures.

11. The method of claim 10, wherein the first guide structure is formed by posts extending from the outer side of the lead frame, and including a step of expanding an end of each of the posts in a forming operation to retain the cover member in position over the sensor.

12. The method of claim 1, wherein, in the second, sensing position, a gap is defined that spaces the sensor from one or both of the outwardly facing surface on the lead frame and the engagement surface on the cover member.

13. A method for positioning a temperature sensor in association with a heat conductive surface in a lead frame for a dynamoelectric machine comprising a stator assembly and a rotor, the method comprising:
    providing a lead frame having a temperature sensor supported thereto by a pair of wire leads extending from the temperature sensor at a second end of the wire leads to a connection on a portion of the lead frame at a first end of the wire leads;
    positioning the lead frame on the stator assembly, the lead frame including an inner side facing toward a stator core of the stator assembly and an oppositely facing outer side, opposite from the stator assembly, and the outer side defining a portion comprising an outwardly facing surface;
    positioning the sensor at a first position with the second end of the wire leads supporting the sensor spaced from the outwardly facing surface of the lead frame, the first position being spaced from a second, sensing position for the sensor; and
    moving a cover member to an attachment location in engagement with the outer side of the lead frame, wherein at least a final portion of the movement of the cover member to engagement with the outer side includes positioning an engagement surface of the cover member into engagement with the sensor and causing the sensor to move closer to the outwardly facing surface of the lead frame to a location defining the second, sensing position.

14. The method of claim 13, wherein the lead frame has a radially outer periphery and a radially inner portion, and prior to the moving of the cover member to the attachment location, the sensor is moved in a first direction from a position supported by the wire leads adjacent to the outer periphery to a position supported by the wire leads between the outer periphery and the inner portion where the sensor is positioned in the first position over the outwardly facing surface.

15. The method of claim 14, wherein causing the sensor to move closer to the outwardly facing surface includes moving the sensor in a second direction that is generally perpendicular to the first direction.

16. The method of claim 15, wherein the sensor has an outer sensor surface, and a portion of the outer sensor surface facing toward the outwardly facing surface is located within a range defined between a location at a predetermined distance from the outwardly facing surface to a location at the outwardly facing surface, as measured along the second direction, when the sensor is in the second, sensing position.

17. A lead frame assembly for a dynamoelectric machine having a stator assembly and a rotor, the lead frame assembly comprising:

a lead frame positioned on an end of a stator core for the stator assembly, the lead frame including an inner side facing toward the stator core and an oppositely facing outer side, opposite the stator assembly, defining a recess;

an electrical conductor extending along the lead frame at an inner portion of the recess and defining an outwardly facing surface within the recess, the outwardly facing surface being located between the inner side and the outer side of the lead frame;

a sensor supported by a pair of wire leads extending across a portion of the outer side of the lead frame, and the sensor located within the recess; and a cover member located in engagement with the outer side of the lead frame and extending across the recess, an engagement surface of the cover member located for engagement with the sensor to position the sensor at a sensing position adjacent to the outwardly facing surface defined by the electrical conductor within the recess.

18. The lead frame assembly of claim 17, wherein the sensor comprises a temperature sensor, and including a thermally conductive gap filler located within the recess between the sensor and the outwardly facing surface.

19. The lead frame assembly of claim 17, wherein the sensor comprises a temperature sensor having an outer sensor surface, and a portion of the outer sensor surface facing toward the outwardly facing surface is located within a range defined between a location at a predetermined distance from the outwardly facing surface to a location at the outwardly facing surface.

* * * * *